Patented Sept. 16, 1941

2,256,261

UNITED STATES PATENT OFFICE 2,256,261

PROCESS FOR PREPARING AZO COMPOUNDS

André Girard, Paris, France, assignor to Les Laboratories Francais de Chimiotherapie, Paris, France, a French company No Drawing. Application July 7, 1939, Serial No. 283,303. In Germany July 12, 1937

11 Claims. (Cl. 260—198)

The great activity against streptococcus shown by 4-nitro-4' amino-diphenylsulphone is already known (Levaditi, Girard, Comptes Rendus de l'Académie des Sciences, v. 205, p. 1018, 1937), as well as its favourable action in the experimental poisoning of mice with the endotoxine of the meningococcus and of the B. Aertrycke (Levaditi, Vaisman, Comptes Rendus de la Société de Biologie, v. 126, p. 1092, 1937).

The great toxicity of this body (Fourneau, Trefouël, Nitti and Bovet, Bulletin de l'Académie de Médecine, v. 118, p. 117, 1937) has however made it unfit for therapeutic use.

The applicant has observed that the azo derivatives of the 4-nitro-4' amino diphenyl-sulphone obtained by diazotation and coupling with coupling agents containing groups causing solubilisation in water, such as the sulphonic acid, carboxylic acid or quaternary ammonium functions, no longer show the toxicity of the original material, while the activity is preserved and it assumes a character of increased polyvalence.

While the maximum dose of p-nitro-p'-amino-diphenylsulphone which can be supported by a mouse weighing 20 grammes is only 10 mgrs., the animal will support without inconvenience a dose of 100 mgrs. of 4-nitro-diphenyl-sulphone-4'-azo-naphthol-1-acetylamino-7-disulphonate of sodium-3.6, or 100 mgrs. of 4-nitro-diphenyl-sulphone-4'-azo-naphthol-2-disulphonate of Na-3.6; and these doses can be repeated several times.

As compared with the already known azo compounds of p-amino-benzene-sulphamide (French Patent 766,081) the new azo compounds have the great advantage of being polyvalent. While carboxy-sulphamido-chrysoidine, for instance, has no action whatever upon mice infected with pneumococcus or with Friedlander bacillus, and the same is true for the 4-nitro-4'-amino-diphenylsulphone itself, the cure of 100% of the infected animals is obtained by the use of 20 mg. daily during 4 consecutive days, of one of the two azo compounds above mentioned.

In order to prepare the new azo compounds having the general formula

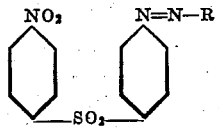

(R being a coupling group having a solubilizing function), the simplest process consists in coupling a diazonium salt of the 4-nitro-4'-amino-diphenylsulphone (which is obtained by the oxidation of the 4-nitro-4'-aminosulphide with or without preliminary protection of the amino-function) with a coupling agent having solubilizing functions, such as the sulphonic acids, the carboxylic acids or the quaternary ammonium functions. However, without departing from the principle of the invention, it is possible to alter the different chemical reactions so as to introduce in any desired order the characteristic groups of these bodies. In some cases it is possible, for instance, to prepare the azo compound of the 4-nitro-4'-amino-diphenyl-sulphide or sulphoxide and then to oxidize it to sulphone. In the azo compounds which may be obtained by the above mentioned method, existing substituents may be transformed into other more suitable substituents. It is for instance possible to transform in the usual manner the amino group of the radical of an amino-naphthalene-sulphonic acid into an hydroxyl group.

One may further, and advantageously, produce the quaternary ammonium function at the end of the reaction, by the action of an alkyl halogen or an alkyl sulphate on the azo compound which is obtained by coupling with a tertiary amine.

It should also be noted that the diazonium salts of the 4-nitro-4'-amino-diphenylsulphone are remarkable for their slight solubility in water and their great stability, which permits of isolating them readily and then coupling them with a suitable coupling agent in order to at once obtain very pure substances.

EXAMPLE 1

*Preparation of 4-nitro-diphenyl-sulphone-4'-azo-naphthol 1-acetylamino-7-disulphonate of sodium 3.6*

288 grammes of 4-nitro-4'-acetylamino-diphenylsulphide are dissolved in the hot state in 3 litres of aqueous acetic acid containing about 10% of water. Allow this to cool to 45° C. and add 30 grammes of KMnO₄ finely powdered, which will at once raise the temperature. When the temperature has returned to 45° C., make another addition of the same quantity of permanganate, and so on until a total of 230 grammes of potassium permanganate has been introduced. When this oxidation has been completed, heat for ten minutes to 80° C. and then precipitate in water containing sodium bisulphite in order to destroy the excess of permanganate and solubilize the MnO₂ which is formed. The 4-nitro-4'-acetyl-amino-diphenylsulphone thus formed is filtered, washed with water and wrung. In order to remove the acetyl, place it in a flask provided with a reflux condenser, and add 900 c. c. of concentrated hydrochloric acid, heat to the boiling point until it is dissolved, then precipitate in 9 litres of water, allow it to cool, and wring it. At this rate of dilution, the nitro-amino-sulphone precipitates entirely in the state of free base, while the corresponding sulphoxide which is formed at the same time in small quantity, remains dissolved in the state of hydrochloride.

The yield of crude p-nitro-p'-amino-sulphone is 265 grammes.

In order to obtain a pure product, it is recrystallized from propanol. Melting point, 169° C., not corrected.

291 grammes of sulphone thus prepared are dissolved in the hot state in 2300 c. c. of hydrochloric acid 4 N, then cool while stirring briskly, in order to obtain a finely-divided hydrochloride, which is but little soluble in the cold state. To this mixture which is constantly given a strong stirring at about 10° C., add by small portions 91 grammes of sodium nitrite finely powdered, and continue the stirring for one hour at the ordinary temperature, then place it on a filter and wash with a small amount of salt water, alcohol or acetone.

The yield of dry chloride of diazonium is 95% of the theoretical amount, or 325 grammes.

On the other hand, prepare a solution of the monosodium salt of 1-hydroxy-7-acetylamino-naphthalene-3.6-disulphonic acid, in the following manner:

A quantity of acid 2R containing exactly one molecule of monosodium salt (molecular weight 341) is dissolved in 1250 c. c. of water, adding 55 grammes of dry sodium carbonate. This solution is placed in an apparatus provided with a stirrer, and is heated to 70° C., then add slowly with a brisk stirring, 102 grammes of acetic anhydride. After 5 minutes, the acetic acid set free is neutralized by adding powdered sodium carbonate until $CO_2$ is no longer given off. Then add 102 grammes of acetic anhydride in the same manner as before, and neutralize with sodium carbonate in order to obtain an alkaline reaction as shown by bromothymol blue.

To this solution of acetylated 2R salt, add the quantity of diazonium chloride obtained from 278 gr. of 4-nitro-4'-amino-diphenyl-sulphone mixed up in the form of fine paste with 700 c. c. of water, then add 106 grammes of dry sodium carbonate. The azo product will at once begin to separate. This is allowed to stand for several hours, and then, after a slight acidifying with acetic acid, it is wrung with care, then its own weight of alcohol is added, and it is again filtered and dried. The 4-nitro-diphenyl-sulphone-4'-azo-naphthol-1-acetylamino-7-disulphonate of sodium-3.6 has the form of a dark brown substance which is quite soluble in water and then shows a positive red colour.

EXAMPLE 2

13.9 grs. of 4-nitro-4'-amino-diphenyl-sulphone are ground in a mortar with 18 c. c. of a solution of sodium nitrite which is three times the normal. Moreover, 30 c. c. of hydrochloric acid 5N are placed in a flask which is well cooled. The paste is slowly introduced into the hydrochloric acid, then the mortar is washed with 5 c. c. of nitrite solution, and the temperature of the mixture is maintained between 7° and 9° C. On the other hand, dissolve 17.4 grs. of 2-hydroxy-naphthalene-3.6-disulphonic acid in a mixture of 150 c. c. water and 25 c. c. concentrated caustic soda. The diazo solution is poured into the alkaline solution, stirring constantly, and the coupling is terminated by a heating on the water-bath. Filter in the hot state and precipitate the sodium salt by adding sodium chloride. The 4-nitro-diphenyl-sulphone-4'-azo-naphthol-2-disulphonate of sodium-3.6 thus obtained is filtered and is crystallized from a slightly alkaline mixture of water and alcohol. After drying on the water-bath, the product has the form of a violet powder which is soluble in water and gives a red solution.

EXAMPLE 3

$\frac{1}{10}$ of a molecule of 1-acetylamino-8-hydroxy-naphthalene-3.6-disulphonic acid prepared according to Fierz ("Opérations Fondamentales de la Chimie des Colorants," edition 1921, p. 148), is coupled in an ammoniacal medium with 33 grammes of diazonium chloride of nitro-amino-sulphone. The product of the coupling is allowed to stand for a few hours, and is then wrung. The 4-nitro-diphenylsulphone-4'-azo-naphthol-8-acetyl-amino 1-disulphonate of sodium-3.6 has the form of a clear red powder which forms aqueous solutions of a bright red colour.

EXAMPLE 4

13.9 grs. of 4-nitro-4'-amino-disphenylsulphone are diazotized according to Example 2. The mineral acidity is neutralized by a solution of sodium acetate 2N, and it is mixed with a solution of 18 grammes of a disodium salt of the 1.8-dioxy-naphthalene-3.6-disulphonic acid diluted in 300 c. c. of water, then adding 150 c. c. of sodium acetate 2N.

The coupling will at once take place. Then filter, and wash with a sodium acetate solution and with alcohol. The 4-nitro-diphenylsulphone-4'-azo-dioxy- 1.8 -naphthalene-disulphonate of sodium, thus produced resembles, when dried, the product obtained in Example 3.

EXAMPLE 5

83 grammes of 4-nitro-4'-aminosulphone are diazotized by means of 105 c. c. of sodium nitrite 3N and 180 c. c. of hydrochloric acid 5N. On the other hand, 115 grammes of naphthol-2-disulphonate of sodium-6.8 are dissolved in 1 litre of water and 165 c. c. of soda 10N. Effect the coupling in the cold state, heat rapidly to 55° C., filter hot in the presence of charcoal, and allow to crystallize when cold. The crystals have the form of violet needles.

EXAMPLE 6

33 grammes of diazonium chloride of the 4-nitro-4'-amino-diphenylsulphone obtained according to Example 1, are placed in 19 grs. of chloromethylate of m-hydroxy-dimethyl-aniline dissolved in 100 c. c. of water, then add 100 c. c. of a 10% sodium carbonate solution. When the coupling is finished, acidify with hydrochloric acid, filter and recrystallize. This is an orange-red powder which is moderately soluble in water. The aqueous solutions of chloromethylate of 4-nitro - diphenylsulphone -4'- azo-m - hydroxy-dimethyl-aniline thus obtained have an orange yellow colour.

EXAMPLE 7

27.8 grs. of 4-nitro-4'-amino-diphenylsulphone are ground up with 100 c. c. of water, 60 c. c. of hydrochloric acid 5N and 100 grammes of ice. Then add 35 c. c. of a solution of sodium nitrite 3N and stir the mixture for ½ hour. On the other hand, prepare a solution of 14 grammes of salicylic acid in 300 c. c. of water and 50 c. c. of concentrated soda. Add ice so as to lower the temperature to 0° C. and add the solution of diazonium salt while constantly stirring. Allow the mixture to stand over night, and then precipitate the product by dilute acetic acid. To purify, dissolve the product in soda, discolour with Norit, and again precipitate the 4-nitro-diphenylsulphone-4'-azo-salicylic acid by dilute acetic acid. Wring this, wash with water, wring again and dry entirely. This is a yellow product, insoluble in water, and moderately soluble in the alkaline carbonates. It dissolves in the alkalies with a red colour.

EXAMPLE 8

34 g. of 5-pyrazolone-3-carboxy-1-phenyl-p-sodium sulphonate are dissolved into 120 c. c. of water containing 6 g. of sodium carbonate. 25 g. of sodium acetate are added and $\frac{1}{10}$ of one molecule (33 g.) of diazonium chloride of the 4-nitro-4'-amino-diphenyl-sulphone in suspension in 100 c. c. of water are introduced into the mixture while stirring continuously. The mass sets gradually and the substances are allowed to react during 4 to 5 hours, then 25 c. c. of concentrated soda are added. The product is dissolved completely, is filtered on animal black and is precipitated by sodium chloride. The crystallized precipitate is filtered by suction, thoroughly wrung and purified by crystallization from aqueous alcohol. The 4-nitro-diphenyl-4'-azo-5''-pyrazolone-3''-carboxy-1''-phenyl-p-sodium sulphonate is obtained in form of brick red powder. By addition of hydrochloric acid to its aqueous solution this latter appears yellow and the acid is precipitated in a gelatinous state.

It is also possible to couple the diazonium chloride of the 4-nitro-4'-amino-diphenyl-sulphone either with the 2,6-diamino-pyridine-sulphonic acid or with the 8-hydroxyquinoline-5-sulphonic acid.

Having now described my invention what I claim as new and desire to secure by Letters Patent is:

1. As a new chemical compound, a substance having the formula

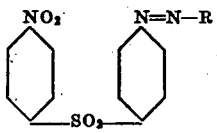

in which R is a radical of a coupling component containing a water solubilizing group.

2. As a new chemical compound, a substance having the formula

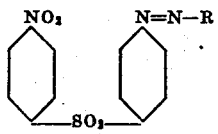

in which R is a radical of a water-solubilizing coupling component substituted by at least one residue of one member of the group consisting of sulphonic acids, carboxylic acids, salts of sulphonic and carboxylic acids and quaternary ammonium salts.

3. As a new chemical compound, the 4-nitrodiphenylsulphone-4'-azo-naphthol-1-acetylamino-7-disulphonate of sodium-3,6.

4. As a new chemical compound, the 4-nitrodiphenylsulphone-4'-azo-naphthol-2-disulphonate of sodium-3,6.

5. As a new chemical compound, the chloromethylate of 4-nitro-diphenyl-sulphone-4'-azo-m-oxy-dimethylaniline.

6. In a method for preparing azo compounds of the 4-nitro-4'-amino-diphenylsulphone, the step which consists in diazotizing an amino compound having the formula

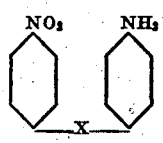

in which X is a member of the group consisting of S, SO and $SO_2$, and coupling the diazo compound thus formed with a coupling component containing at least one water solubilizing group, the group X, if originally S or SO, being oxidized into $SO_2$ before the completion of the process.

7. A method for preparing azo compounds of the 4-nitro-4'-amino-diphenylsulphone, consisting in subjecting an amino-compound having the formula

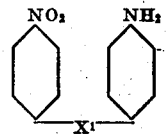

in which $X^1$ is a member of the group consisting of S and SO to the two following treatments in any desired order, one of said treatments consisting in an oxidizing treatment so as to transform the element $X^1$ into $SO_2$, and the other treatment consisting in a diazotizing treatment followed by a coupling of the diazo compound formed with a coupling component containing at least one water solubilizing group.

8. A method for preparing azo compounds of the 4-nitro-4'-amino-diphenyl-sulphone, consisting in diazotizing an amino compound having the formula

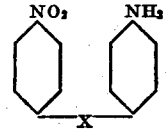

in which X is a member of the group consisting of S, SO and $SO_2$ and coupling the diazo compound thus formed with a water-solubilizing coupling component substituted by at least one residue of one member of the group consisting of sulphonic acids, carboxylic acids, salts of sulphonic and carboxylic acids, and quaternary ammonium salts, the group X, if originally S or SO, being oxidized into $SO_2$ before the completion of the process.

9. A method for preparing azo compounds of the 4-nitro-4'-amino-diphenyl-sulphone consisting in diazotizing the 4-nitro-4'-amino-diphenylsulphone and to couple the diazo compound obtained with 1-oxy-7-acetylamino-naphthalene-3,6-disulphonic acid.

10. A method for preparing azo compounds of the 4-nitro-4'-amino-diphenyl-sulphone consisting in diazotizing the 4-nitro-4'-amino-diphenylsulphone and to couple the diazo compound obtained with 2-oxy-naphthalene-3,6-disulphonic acid.

11. A method for preparing azo compounds of the 4-nitro-4'-amino-diphenyl-sulphone consisting in diazotizing the 4-nitro-4'-amino-diphenylsulphone and to couple the diazo compound obtained with m-oxy-dimethylaniline-chloro-methylate.

ANDRÉ GIRARD.